(12) United States Patent
Ostwald et al.

(10) Patent No.: US 8,855,808 B2
(45) Date of Patent: Oct. 7, 2014

(54) STORAGE MAGAZINE WITH INTEGRATED TARGETING

(75) Inventors: Timothy Craig Ostwald, Boulder, CO (US); Matthew David Woodbury, Westminster, CO (US); Daniel James Plutt, Superior, CO (US)

(73) Assignee: Oracle International Corporation, Redwood City, CA (US)

( * ) Notice: Subject to any disclaimer, the term of this patent is extended or adjusted under 35 U.S.C. 154(b) by 71 days.

(21) Appl. No.: 13/480,412

(22) Filed: May 24, 2012

(65) Prior Publication Data

US 2013/0317643 A1   Nov. 28, 2013

(51) Int. Cl.
  *G06F 7/00*   (2006.01)
(52) U.S. Cl.
  USPC ........... 700/218; 700/213; 700/214; 700/215; 700/220
(58) Field of Classification Search
  None
  See application file for complete search history.

(56) References Cited

U.S. PATENT DOCUMENTS

2009/0296541 A1 * 12/2009 Hashimoto ................ 369/36.01

* cited by examiner

*Primary Examiner* — Yolanda Cumbess
(74) *Attorney, Agent, or Firm* — Marsh Fischmann & Breyfogle LLP; Daniel J. Sherwinter

(57) ABSTRACT

Embodiments include systems and methods for targeting using storage magazines. Some embodiments operate in context of a data storage environment, in which the magazines are used to hold data cartridges, and the data cartridges are installed in, removed from, and ferried between the magazines by a robotic mechanism. Magazine implementations include integrated targeting features in the magazine base structure. For example, some side walls of the magazine slots are shaped for optical targeting, while other side walls of the magazine slots are shaped for lead-in (i.e., to minimize undesirable collisions or interference between the cartridges and the magazine slot walls). Some embodiments describe novel locating functionality in context of magazines with integrated targeting features. Other embodiments include other geometric magazine features.

19 Claims, 9 Drawing Sheets

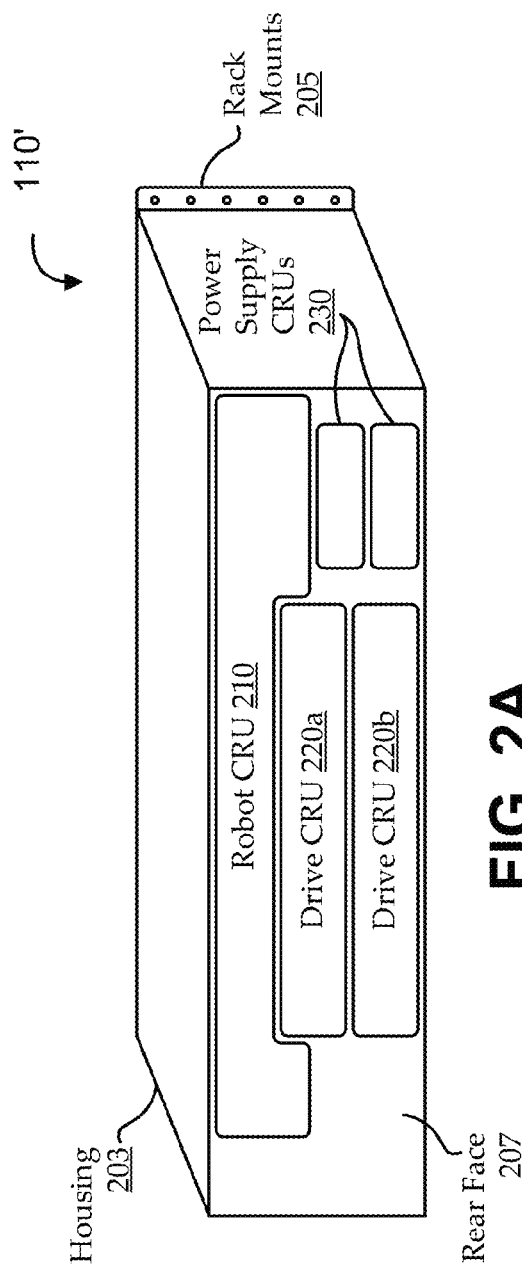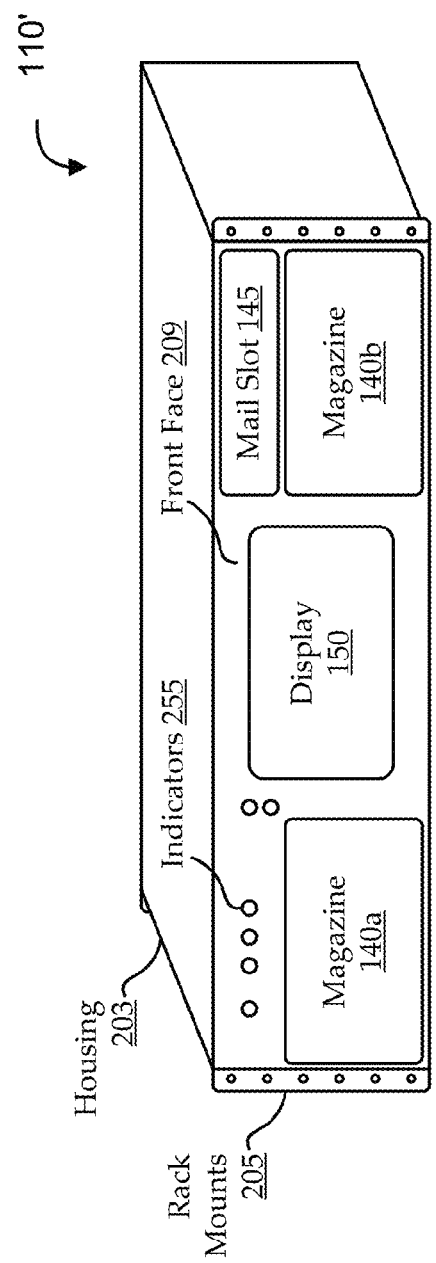

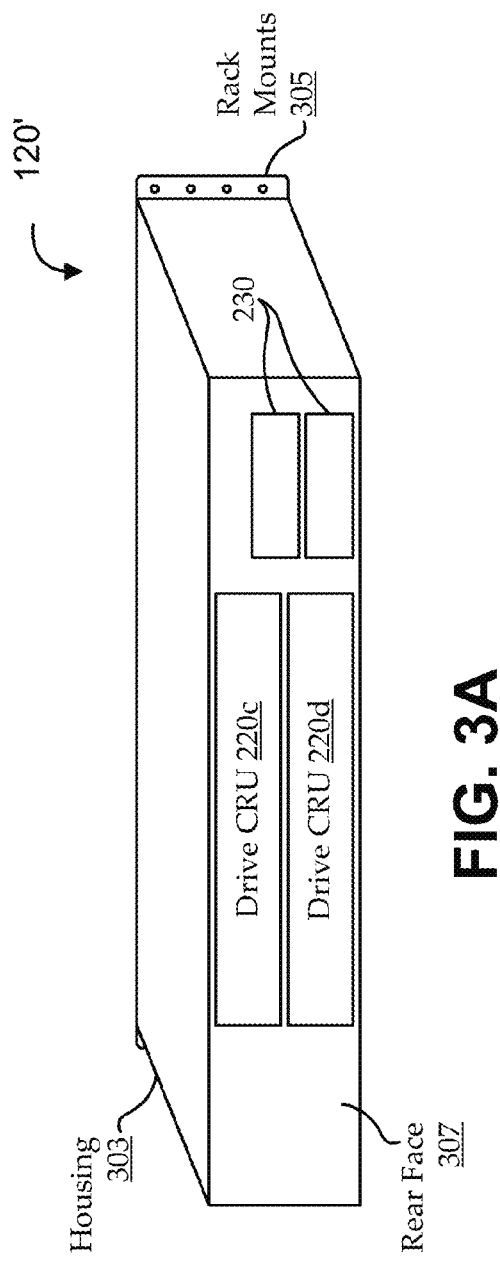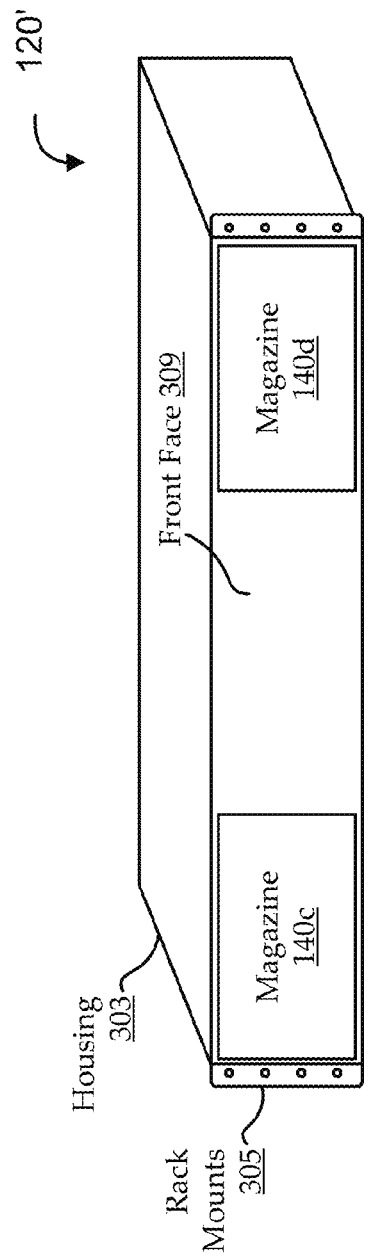

STORAGE MAGAZINE WITH INTEGRATED TARGETING

FIELD

Embodiments relate generally to data storage systems, and, more particularly, to cartridge magazines for use in storage libraries.

BACKGROUND

Storage library systems are often used by enterprises and the like to efficiently store and retrieve data from storage media. In the case of some storage libraries, the media are data cartridges (e.g., tape cartridges) that are typically stored and indexed within a set of magazines. When particular data is requested, a specialized robotic mechanism finds the appropriate cartridge, removes the cartridge from its magazine, and carries the cartridge to a drive that is designed to receive the cartridge and read its contents. Some storage libraries have multiple drives that can operate concurrently to perform input/output (10) operations on multiple cartridges.

Ensuring proper functioning of the storage library involves secure and accurate positioning of components, including magazines. Further, various functions involve accurate positioning of the robotic mechanism in context of the magazines and other components. To this end, traditional implementations often include a variety of sensors, targets, and the like, which can add cost and complexity.

BRIEF SUMMARY

Among other things, embodiments provide novel systems and methods for targeting using storage magazines. Embodiments operate in context of a data storage environment, in which the magazines are used to hold data cartridges, and the data cartridges are installed in, removed from, and ferried between the magazines by a robotic mechanism. The magazines can be configured to have targeting features integrated in the magazine base structure in such a way that is space-efficient, while also being less costly and less complex than many traditional targeting techniques. For example, some side walls of the magazine slots are shaped for optical targeting, while other side walls of the magazine slots are shaped for lead-in (i.e., to minimize undesirable collisions or interference between the cartridges and the magazine slot walls). Some embodiments describe novel locating functionality in context of magazines with integrated targeting features.

According to one set of embodiments, a method is provided for positioning a robotic mechanism with respect to a storage magazine to install a data cartridge in or remove the data cartridge from a destination slot of a plurality of slots of the storage magazine. The method includes: scanning across the storage magazine using an optical scanner to acquire scan data; processing the scan data to identify a targeting feature and a target location corresponding to the identified targeting feature, wherein each of the plurality of slots is defined by a structural opening having at least a first side shaped for lead-in and a second side opposite the first side and shaped for either lead-in or targeting, the identified targeting feature being a second side of one of the plurality of slots shaped for targeting; determining a slot location of the destination slot according to the target location; determining whether the second side of the destination slot is shaped for targeting; positioning the robotic mechanism according to the slot location; and positionally biasing the robotic mechanism toward the first side of the destination slot when the second side of the destination slot is shaped for targeting.

According to another set of embodiments, a storage system is provided. The system includes a magazine having a number of slots operable to receive data cartridges via an opening having a first side shaped for lead-in and a second side opposite the first side and shaped for either lead-in or targeting, wherein at least one slot has its second side shaped for targeting. The system further includes an optical scanner operable to scan across the magazine to acquire scan data; a robotic hand assembly operable to install a data cartridge in or remove the data cartridge from a destination slot of the plurality of slots of the magazine; and a processor. The processor is operable to: process the scan data to identify a targeting feature and a target location corresponding to the identified targeting feature, wherein the identified targeting feature is a second side of one of the plurality of slots shaped for targeting; determine a slot location of a destination slot according to the target location; determine whether the second side of the destination slot is shaped for targeting; position the robotic hand assembly according to the slot location; and positionally bias the robotic hand assembly toward the first side of the destination slot when the second side of the destination slot is shaped for targeting.

BRIEF DESCRIPTION OF THE DRAWINGS

The present disclosure is described in conjunction with the appended figures:

FIGS. 2A and 2B show rear and front views, respectively, of an illustrative base module, according to various embodiments;

FIGS. 3A and 3B show rear and front views, respectively, of an illustrative expansion module, according to various embodiments;

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
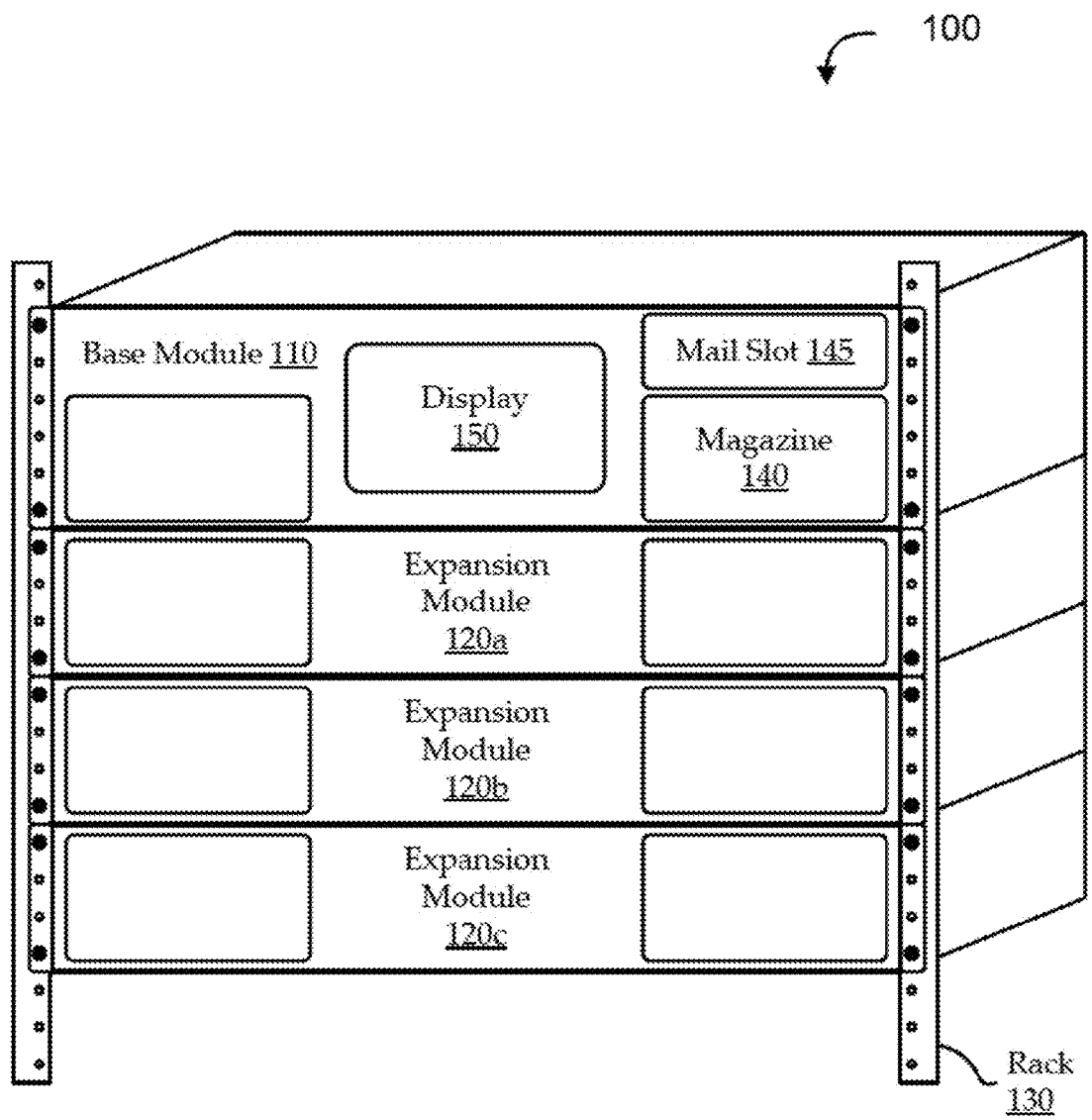
FIG. 1 shows a block diagram of an illustrative rack-mounted storage library, to provide a context for various embodiments.

For the sake of context, FIG. 1 shows a rack-mounted storage library 100 for use with various embodiments. The storage library 100 includes a base module 110 and one or more expansion modules 120, configured to be mounted in an equipment rack 130 (only the mounting rails of the equipment rack 130 are shown for simplicity). The base module 110 and expansion modules 120 provide physical storage for multiple storage media cartridges (e.g., tape cartridges) in magazines 140. Embodiments also include one or more media drives (e.g., tape drives), controllers, power supplies, indicators, communications subsystems, and/or other functions. As will be discussed more fully below, the storage library 100 also includes a robotic mechanism for finding and ferrying storage media cartridges between locations within the storage library 100 (e.g., magazines 140 and drives).

According to an illustrative embodiment, the storage library 100 is a small, rack-mounted, automated tape library. The base module 110 is "3 RU" high (three standard rack units, or approximately 5.25-inch high) and includes one robotic mechanism. Up to nine additional, "2 RU" high (approximately 3.5-inch high) expansion modules 120 can be added to provide additional drive and/or magazine 140 slot capacity, so that a maximum configuration of one base module 110 and nine expansion modules 120 has a total height of "21 RU," or half of a standard equipment rack 130. The single robot mechanism is configured to access all magazine 140 slots and drives in the base module 110 and all expansion modules 120.

In the illustrative embodiment, each of the base module 110 and the expansion modules 120 can house up to two half-height or one full-height LTO5 tape drives. Each of the base module 110 and the expansion modules 120 can also house two removable magazines 140, each having fifteen cartridge slots. In some implementations, the storage library 100 can be divided into partitions each associated with, for example, at least one drive and at least one magazine 140. Each partition can be configured to behave as an independent library, notwithstanding that all partitions share the single robotic mechanism (e.g., partitions can be commanded as independent libraries for tape operations, while sharing many resources for service and administration). Some implementations also include a "mailslot" 145 in the base module 110, as discussed below.

Some embodiments provide local and remote management of various functions through graphical user interfaces (GUI). In one implementation, the local interface GUI is displayed on a seven-inch, front-mounted, touch-screen panel display 150. The remote interface may be implemented as a browser-based interface (BUI), accessible by connecting a web browser to the library's Internet protocol (IP) address.

Some embodiments are configured to be installable and serviceable by end customers to the greatest extent practical. For example, an installation wizard may be provided to simplify initial installation, a simple rack rail system for base modules 110 and expansion modules 120 will allow two people without any mechanical assistance (e.g. lift) to easily install the modules on an equipment rack 130. In some such embodiments, most replaceable library components will be Customer Replaceable Units (CRUs) (i.e., as opposed to field replaceable units (FRUs), which are serviceable and/or replaceable only by trained technicians). For example, certain implementations allow almost all installation, maintenance, upgrades, and/or normal use of the storage library 100 to be performed with only front and rear access to the equipment rack 130 and few or no tools.

FIGS. 2A and 2B show rear and front views, respectively, of an illustrative base module 110', according to various embodiments. The illustrative base module 110' may be an implementation of base module 110 of FIG. 1. As shown, the base module 110' includes a housing 203 (e.g., a chassis) configured with rack mounts 205 for mounting to an equipment rack (e.g., as shown in FIG. 1). A rear face 207 and a front face 209 are also shown as part of the housing 203. As discussed above, embodiments such as the one illustrated as base module 110', are designed to facilitate customer serviceability. Accordingly, most of the replaceable components are shown as accessible from the front and rear exterior of the base module 110', which would be substantially exposed when mounted in a standard equipment rack.

Looking at the rear view of the base module 110' in FIG. 2A, access is provided to a robot CRU 210, one or more drive CRUs 220, and one or more power supply CRUs 230. As will be described more fully below, the robot CRU 210 is configured to house the robotic mechanism and supporting components (e.g., mechanical drive modules, control hardware and software modules, configuration memory, etc.). Traditional storage library systems typically are configured so that the robotic mechanisms are only serviceable by highly trained personnel, and even removing the mechanism to send out for off-site servicing requires training, specialized tools, or the like. The ability to replace the entire robotic mechanism and all its supporting components in a single CRU is a novel improvement over traditional implementations. For example, implementations allow a customer to simply pop out a broken robot CRU 210 using a couple of thumb screws, slide in a replacement CRU, and reinitialize the system, without waiting for a technician to troubleshoot and fix any issues.

Embodiments of the drive CRUs 220 are media drive modules that can be removed by an end consumer. Various implementations support standard, half-height or full-height tape drives. As described more fully below, the port in the drive for receiving a media cartridge faces into the base module 110', so that media cartridges can only be inserted and/or removed by the robotic mechanism within the confines of the housing 203. In some implementations, one or more "external" media drives may be provided to facilitate troubleshooting and the like.

Embodiments of the power supply CRUs 230 include any useful type of power supply components for supplying power to the base module 110' and or to any other components (e.g., to one or more expansion modules 120 (not shown)). For example, the power supply CRUs 230 can include power generators, power converters, power conditioners, back-up batteries and/or other power duplication, switches, input and/or output ports, indicators, and the like. In some implementations, each power supply CRU 230 includes a male, three-prong connector for interfacing with line power and a main power switch. Some embodiments include a power supply CRU 230 for each drive CRU 220 (i.e., if the base module 110' has only a single drive CRU 220, it may also only have a single power supply CRU 230 to support the drive). In other embodiments, a second power supply CRU 230 is used as a backup supply to the first power supply CRU 230, and may be coupled with a different power source.

In one implementation, the base module 110' has slots for two power supplies (e.g., two power supply CRUs 230). These can be implemented as custom power supplies, for example, having an input voltage of 100-250 volts AC at 50-60 Hertz, and an output voltage of twelve volts DC switched plus five volts DC standby power. For example, the power supplies may be sized to run two tape drives plus robotics and any other sensors, etc. (e.g., with or without redundancy). Typically, the base module 110' has at least one power supply, even if no drives are included, to support the main processor, interface functionality (e.g., the display 150), etc.

Looking at the front view of the base module 110' in FIG. 2B, access is provided to a display 150, one or more magazines 140, and a mailslot 145. One or more indicators 255 may also be provided to show certain operational states, and the like (note that the sizes, numbers, positions, etc. of the indicators shown are intended only to be illustrative). In various implementations, base module 110 has overall library status indicators on the front and back of the module, along with a locate switch which activates the front and back locate LEDs; powered CRUs may have their own status indicators; hot-swappable CRUs can have indicators that show when the CRUs can be safely removed; power supplies and tape drives can have additional indicators; an "AC present" indicator can be provided to stay on even when the storage library is off (as long as AC power is connected). In one embodiment, a set of primary indicators include "locate," "fault," and "OK" indications. Next to the primary indicators are secondary indicators specific for the operator panel that indicate the status of the operator panel (e.g., an operator panel CRU, if implemented as such).

Other types of indications and status can also be provided using the display 150. Embodiments of the display 150 are used to facilitate various functionality through a local graphical user interface (GUI), including, for example, IO functions, service and diagnostic functions, etc. In one implementation, the display 150 is a seven-inch, front-mounted, touch-screen panel (e.g., an LCD touch panel display with a WVGA (wide VGA) 800×480 pixel screen equipped with a resistive or capacitive touch-sensitive overlay).

Each magazine 140 can be configured to hold multiple (e.g., up to fifteen) cartridges in such a way as to be reliably accessed by the robotic mechanism. For example, the magazines 140 can be designed to have features to aid in targeting, location, and or other functions of the robotic mechanism; features that securely hold the cartridges in place, while allowing for easy release of the cartridges to a robotic gripper when desired; features to add strength to the magazines 140 (e.g., to reduce sag, increase usable life, etc.) and/or to reduce weight; etc.

Embodiments of the mailslot 145 (or "Cartridge Access Port" (CAP)) include a special type of magazine designed to act as a controlled interface between the human user and the robotic mechanism. To add or remove cartridges from the storage library, a user ejects the mailslot 145 from the base module 110' and is presented with a number of cartridge slots (e.g., four "Import/Export cells" ("I/E cells")). The user can then insert cartridges into, or remove cartridges from, these slots without interfering with robotic mechanism's operations. In some implementations, the robotic mechanism is used to activate a latch internal to the base module 110, thereby allowing the user to remove the mailslot 145 only when the robotic mechanism is in an appropriate condition (e.g., parked in the robot CRU 210). Certain embodiments having data partitions (as discussed above) only allow one partition at a time to make use of the mailslot 145.

FIGS. 3A and 3B show rear and front views, respectively, of an illustrative expansion module 120', according to various embodiments. The illustrative expansion module 120' may be an implementation of expansion module 120 of FIG. 1. As shown, the expansion module 120' includes a housing 303 (e.g., a chassis) configured with rack mounts 305 for mounting to an equipment rack (e.g., as shown in FIG. 1). A rear face 307 and a front face 309 are also shown as part of the housing 303. As with the base module 110' of FIGS. 2A and 2B, the expansion module 120' is designed to facilitate customer serviceability. Most of the replaceable components are shown as accessible from the front and rear exterior of the expansion module 120', which would be substantially exposed when mounted in a standard equipment rack.

In the embodiment shown, various aspects of the expansion module 120' are similar or identical to the base module 110'. For example, embodiments of the expansion module 120' do not typically have a robot CRU 210, display 150, or mailslot 145, as they are configured to exploit that functionality from the base module 110' components. However, like the base module 110', the expansion module 120' includes one or more drive CRUs 220 and one or more power supply CRUs 230 configured to be accessed from the rear side of the expansion module 120', and one or more magazines 140 configured to be accessed from the front side of the expansion module 120'. In some embodiments, the drive CRUs 220, power supply CRUs 230, and/or magazines 140 of the expansion module 120' are the same as those implemented in the base module 110'.

Because of the lack of certain features in embodiments of the expansion module 120' (e.g., there may be no robot CRU 210, no main processor, etc.), expansion module 120' power requirements may be different from those of the base module 110. In certain implementations, the expansion modules 120' still have slots for two power supplies (e.g., two power supply CRUs 230), which can be implemented as the same power supplies used in the base module 110 (e.g., to avoid having to support or source multiple types of power supplies). However, the power supplies of the base module 110 may provide more power than is needed to run configurations of the expansion modules 120'. For example, a single power supply may be able to support an expansion module 120' even with two drives, and it is possible to implement an expansion module 120' with no drives and no power supplies. Alternatively, two power supplies may still be used, for example, to provide redundancy.

As discussed above, the base module 110' and expansion modules 120' include a number of components that can be designed for customer replaceability, including the robot CRU 210, drive CRUs 220, power supply CRUs 230, and magazines 140. It is worth noting that, even though these components may be accessible and replaceable by customers, embodiments may still be configured to prevent (or mitigate) undesirable interference with those components. As one example, those replaceable components typically are installed in a physically secure manner (e.g., using latches, thumbscrews, removable faceplates, and/or other techniques) to provide relatively easy access when needed, while mitigating inadvertent access (e.g., accidental removal of a magazine 140 during operation). As another example, certain embodiments may allow a drive CRU 220 to be removed during operation of the storage system, so long as the drive is not actively in use (e.g., by using a drive eject or park command, or other technique). As still another example, removal of the robot CRU 210 or magazines 145 may be prevented until certain operations have been completed (e.g., the robotic mechanism is parked within the base module 110', etc.).

Figure 4:
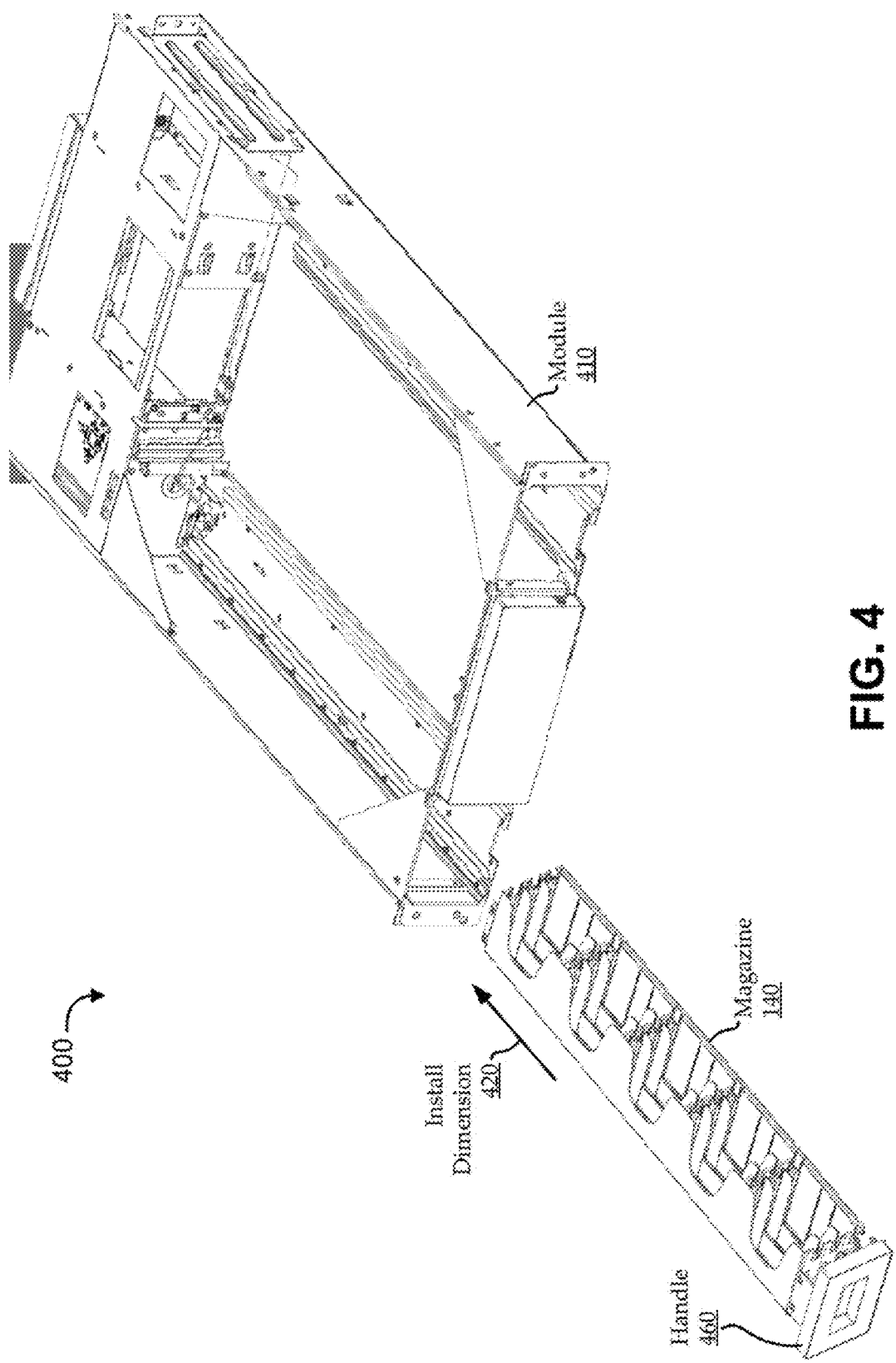
FIG. 4 shows an illustrative installation environment that includes a module (or "housing") and a magazine configured to be installed in the module, according to various embodiments.

Turning to FIG. 4, an illustrative installation environment 400 is shown that includes a module 410 (or "housing") and a magazine 140 configured to be installed in the module 410, according to various embodiments. The module 410 may be a base module 110, an expansion module 120, or the like. The module 410 is shown removed from the context of a larger data storage system for the sake of clarity. The module 410 may include one or more installation locations for receiving a magazine 140. For example, the module 410 illustrated is configured to receive two magazines 140.

As illustrated, the magazine 140 is configured to be installed (e.g., slidably engaged) in an installed dimension 420 into the module 410. The magazine 140 may include various types of hardware, including, for example, a handle 460 and various types of installation structures. In some implementations, the handle 460 can be used to slidably engage the magazine 140 with and/or disengage the magazine 140 from the module 410. As described above, the magazine 140 defines a number of slots configured to hold data storage cartridges. The module 410 is configured (e.g., sized, shaped, etc.) to facilitate use of the robotic mechanism (not shown) to install data storage cartridges in and/or remove data storage cartridges from the slots of the magazine 140.

Various functionality of a data storage system involves accurate positioning of one or more components. For example, reliable use of the robotic mechanism to interface with cartridges may involve precise positioning of the robotic mechanism with respect to slots of the magazine 140. Embodiments of the magazine 140 include various features that facilitate this type of precise relative positioning. The illustrated module 410 is configured to fit within "2 RU" of a standard equipment rack. In that space, the module 410 is configured to support two magazines 140 holding fifteen data cartridges each, at least one tape drive, and other electrical and mechanical hardware. Accordingly, novel techniques are described herein for including positioning (e.g., targeting) features on the magazines 140 within limited space constraints, like those of the illustrated module 410.

Figure 5:
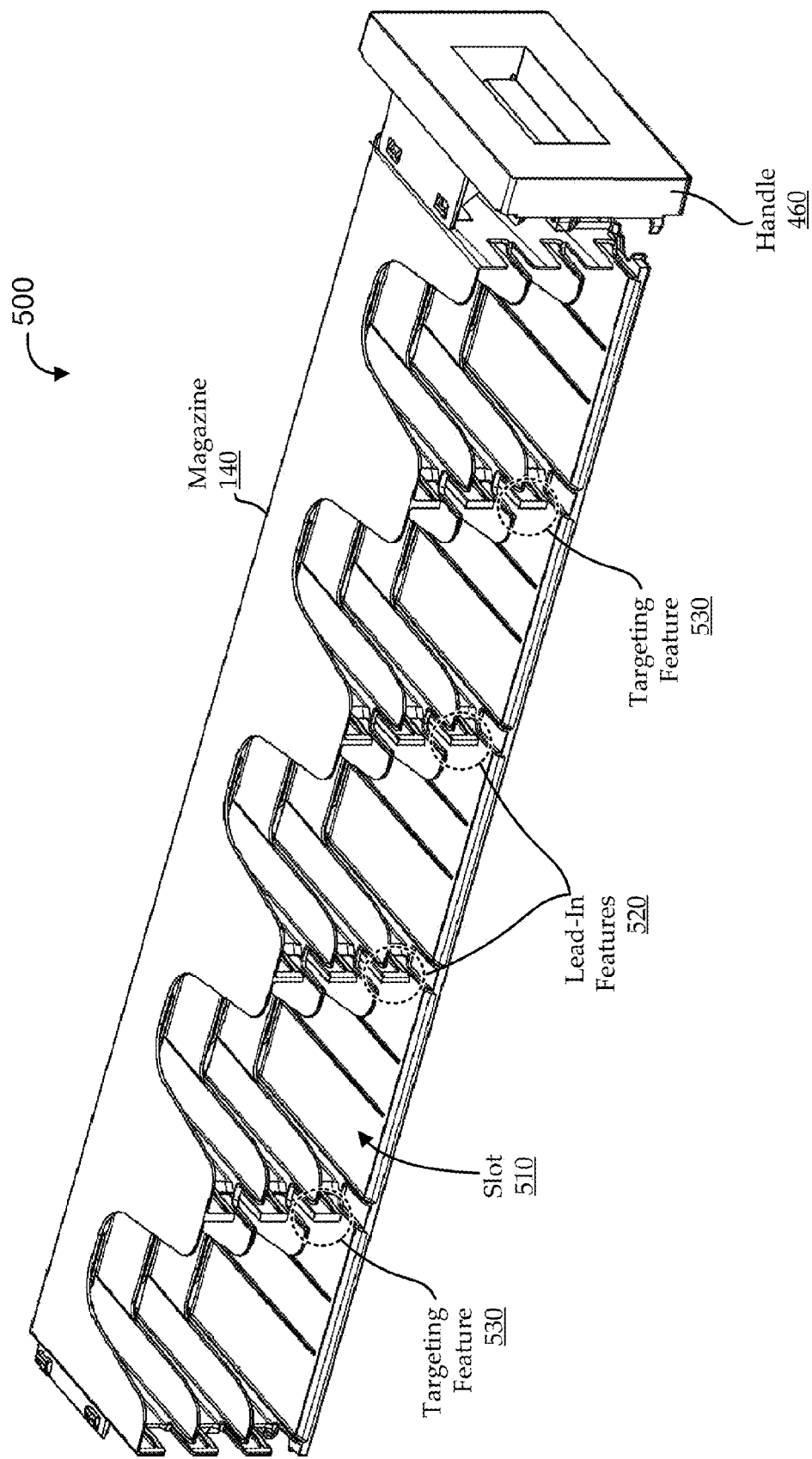
FIG. 5 shows a projection view of an illustrative magazine, according to various embodiments.

FIG. 5 shows a projection view 500 of an illustrative magazine 140, according to various embodiments. The magazine 140 is shown out of the context of a module or other type of installation housing for the sake of clarity. As illustrated, the magazine 140 includes a structural framework that defines a number of features, including a number of slots 510, lead-in features 520, and targeting features 530. In the specific embodiment shown, the magazine 140 includes fifteen slots 510 for holding data cartridges, arranged in three rows of five slots 510 each. Each slot 510 includes multiple walls defined by multiple substructures. In some implementations, the structural framework, including the multiple substructures, is manufactured as a single (e.g. molded plastic) structure; while in other implementations, multiple components are pieced together to form the structural framework.

Each slot 510 can be considered as having at least a first side and a second side that are on opposite sides of an opening. Each side is configured to have either a lead-in feature 520 or a targeting feature 530. The lead-in features 520 may include bevels, radii, and/or any other geometry that reduces collision interference between a data cartridge and the slot substructure (e.g., as the data cartridges being installed in the respective slot 510). Embodiments of the magazine 140 are configured so that at least one side of every slot 510 has the lead-in feature 520. For example, when using a robotic mechanism to install a data cartridge in a slot 510, the robotic mechanism can be positionally biased toward the lead-in feature 520 to mitigate interference with the magazine 140 structure that may result from any tolerance buildup in the robotic mechanism positioning.

At least one side of at least one slot 510 includes the targeting feature 530. The targeting feature 530 is shaped to facilitate edge recognition and location by an optical scanner. For example, the targeting feature 530 includes one or more edges that are sufficiently sharp to allow optical scanning across the edge to identify and locate the edge within a predetermined accuracy. According to some implementations, the targeting feature 530 is rectangular, such that it has too long edges and two short edges, and the long edges are orthogonal to the short edges. As will be described below, this type of implementation can facilitate positioning in two axes, even when the robotic mechanism's prior positioning was reached using dead reckoning or other techniques that may provide insufficient accuracy for a desired operation.

Traditional data storage systems use various types of targeting techniques. Some traditional techniques attach a target, such as a light guide, to each slot 510 of the magazine 140. Other traditional techniques attach multiple targets to the structure of the magazine 140 and/or the larger data storage structural framework. These techniques tend to add cost and complexity to the design while also using up appreciable amounts of space in the data storage system. Techniques described herein can be used to include one or more targeting features in the base structure of the magazine 140, which can thereby avoid appreciable increases in cost, complexity, or space associated with the targeting.

Typically, embodiments of the magazine 140 include at least two targeting features 530. Having two targeting features 530 facilitates interpolation of data that can be used for targeting and locations other than those immediately adjacent to a targeting feature 530. Alternatively, one targeting feature 530 can be used along with other techniques (e.g., dead reckoning, other sensors, etc.). In the embodiment shown, the magazine 140 includes six targeting features 530. The illustrated arrangement of the six targeting features 530 can contribute simplicity to the magazine 140 design, for example, in relation to molding, etc. Notably, the six targeting features 530 are arranged so that at least one side substructure of every slot 510 has a lead-in feature 520 (i.e., every slot 510 has no more than one side substructure with a targeting feature 530). In this way, the sharp edges of the targeting features 530 can be incorporated into the base magazine 140 structure without undesirably increasing collisions between data cartridges and the slot structures during installation of the data cartridges.

Figure 6:
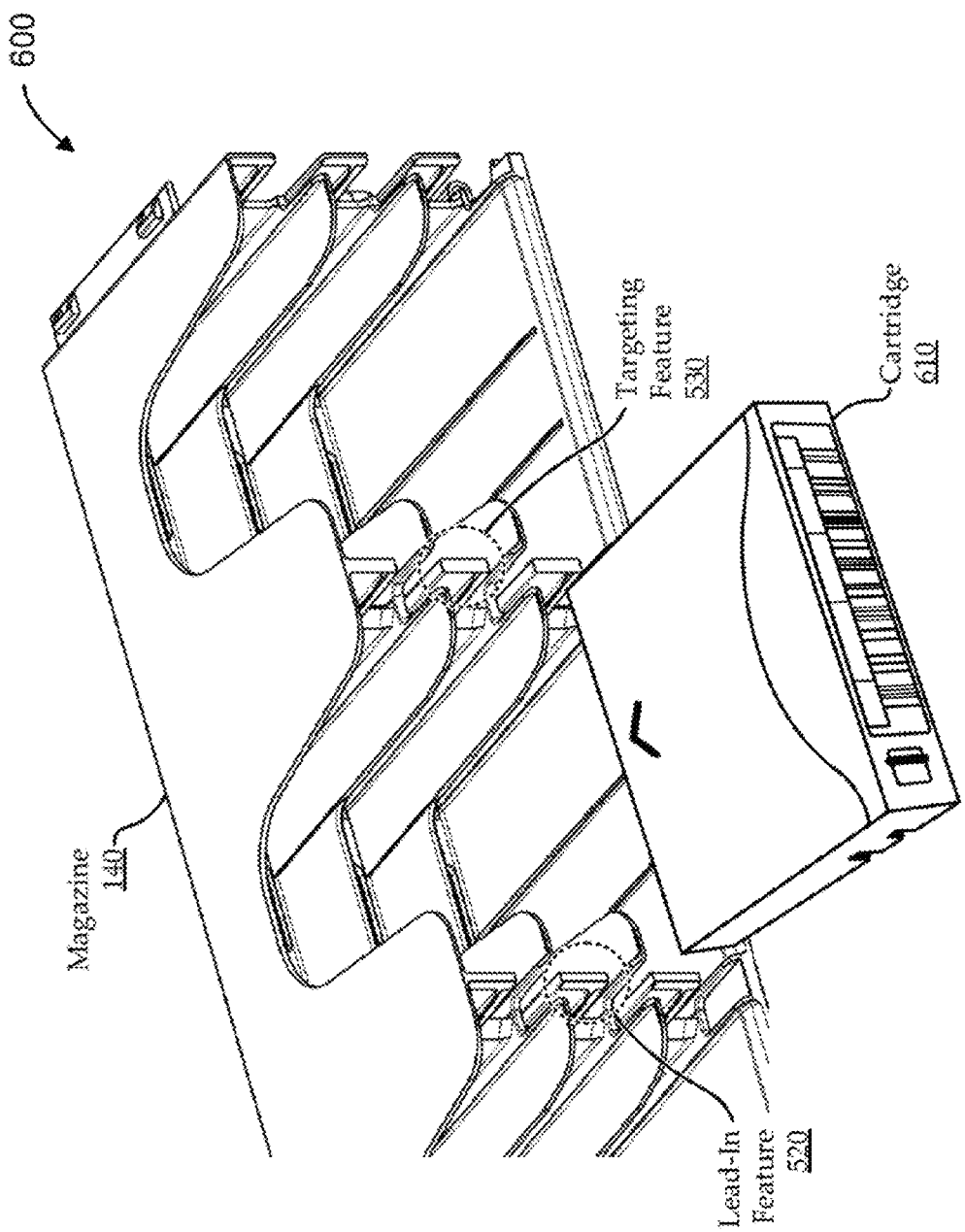
FIG. 6 shows a close-up view of a portion of an illustrative magazine, like the magazine of FIG. 5, according to various embodiments.

For the sake of added clarity, FIG. 6 shows a close-up view 600 of a portion of an illustrative magazine 140, like the magazine 140 of FIG. 5, according to various embodiments. As illustrated, a data cartridge 610 is being installed in a slot of a magazine 140. The substructure on one side of the slot is shaped with a lead-in feature 520, and the substructure on the opposite side of the slot is shaped with a targeting feature 530. In some embodiments, the targeting features 530 are surrounded by features designed to improve detection of the targeting features 530. For example, the targeting features 530 can be configured so that sweeping an optical scanner across an edge of the targeting feature 530 generates a distinct dark-to-light transition in the scan data. Geometry surrounding the targeting feature 530 can be angled, positioned, colored, and/or otherwise configured to minimize reflectivity, thereby reducing the chance that any surrounding features will be falsely recognized as a target edge. In the embodiment shown, the regions directly adjacent to the long edges of the targeting features 530 are relatively deep to enhance optical recognition of the long edges, and the regions directly adjacent to the shortages of the targeting features 530 are significantly angled to deflect light away from those edges and to enhance optical recognition thereof.

Figure 7:
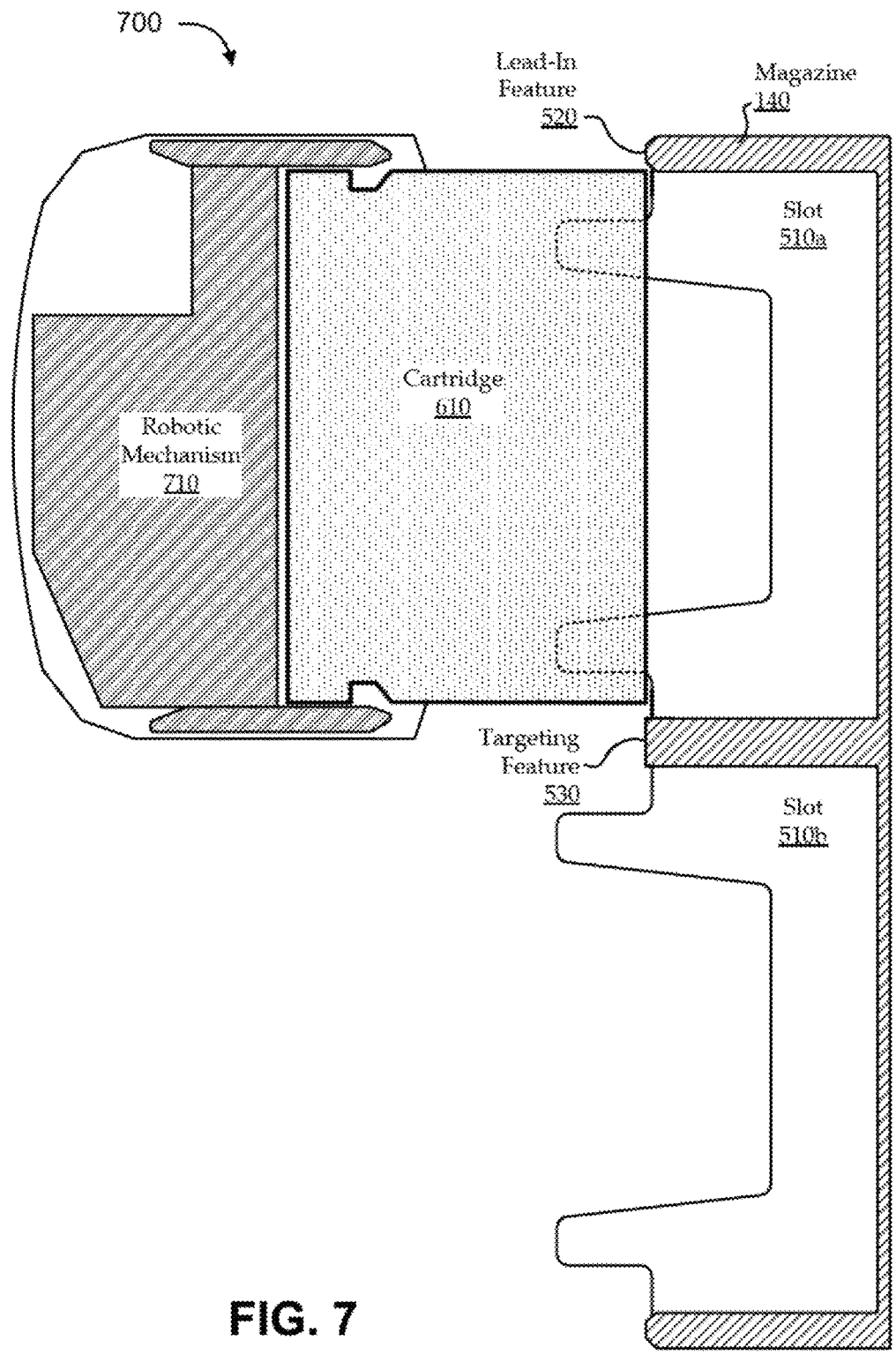
FIG. 7 shows a simplified, cross-sectional, top view of the cartridge being installed by a robotic mechanism into a slot of a magazine, according to various embodiments.

Turning to FIG. 7, a simplified, cross-sectional, top view 700 is shown of the cartridge 610 being installed by a robotic mechanism 710 into a slot 510 of a magazine 140, according to various embodiments. The robotic mechanism 710 can be configured to install cartridges 610 into slots 510 and to remove cartridges 610 from slots 510 of the magazine 140, to ferry cartridges to desired locations within the data storage system environment, and/or to perform other functions. In some embodiments, the robotic mechanism 710 includes one or more optical scanners (not shown) that can be swept across portions of the magazine 142 collect scan data for use in targeting. In other embodiments, one or more optical scanners are implemented separately from the robotic mechanism 710.

As shown, the substructure of one slot 510 may also be the substructure of an adjacent slot 510. For example, suppose that a first slot 510a is directly adjacent to the left of a second slot 510b, and the first slot 510a has a targeting feature 530 on its right side. The second slot 510b can be configured so that its left-hand substructure is the right-hand substructure of the first slot 510a, so that the second slot 510b has the targeting feature 530 on its left side. For the two slots 510 shown, one side of each is shaped with a lead-in feature 520 and the opposite side of each is shaped with a targeting feature 530.

In some implementations, various tolerances in the robotic mechanism 710, manufacturing of the magazine 140, and/or other components can manifest in location error. If the error causes the robotic mechanism 710 to position the cartridge 610 so that an edge of the cartridge 610 overlaps with an edge of the targeting feature 530, an attempted installation of the cartridge 610 can cause the cartridge 610 to collide with the targeting feature 530. This can result in damage to one or more components, and inability to properly install the cartridge 610, and or other undesirable effects. The lead-in features 520 are configured to mitigate this type of collision. As illustrated, each lead-in feature 520 is curved and/or angled over a region that is large enough to account for accumulated location tolerances, and to provide a soft entry point for a cartridge 610. For example, should an edge of a cartridge 610 collide with the lead-in feature 520, the lead-in feature 520 will effectively guide the cartridge 610 into the slot 510 without an undesirable level of interference. According to some embodiments, one performing certain types of functions (e.g., installing a cartridge 610), the robotic mechanism 710 is positionally biased toward the lead-in feature 520 so that any accumulated tolerances can be taken up by the lead-in geometry.

Figure 8:
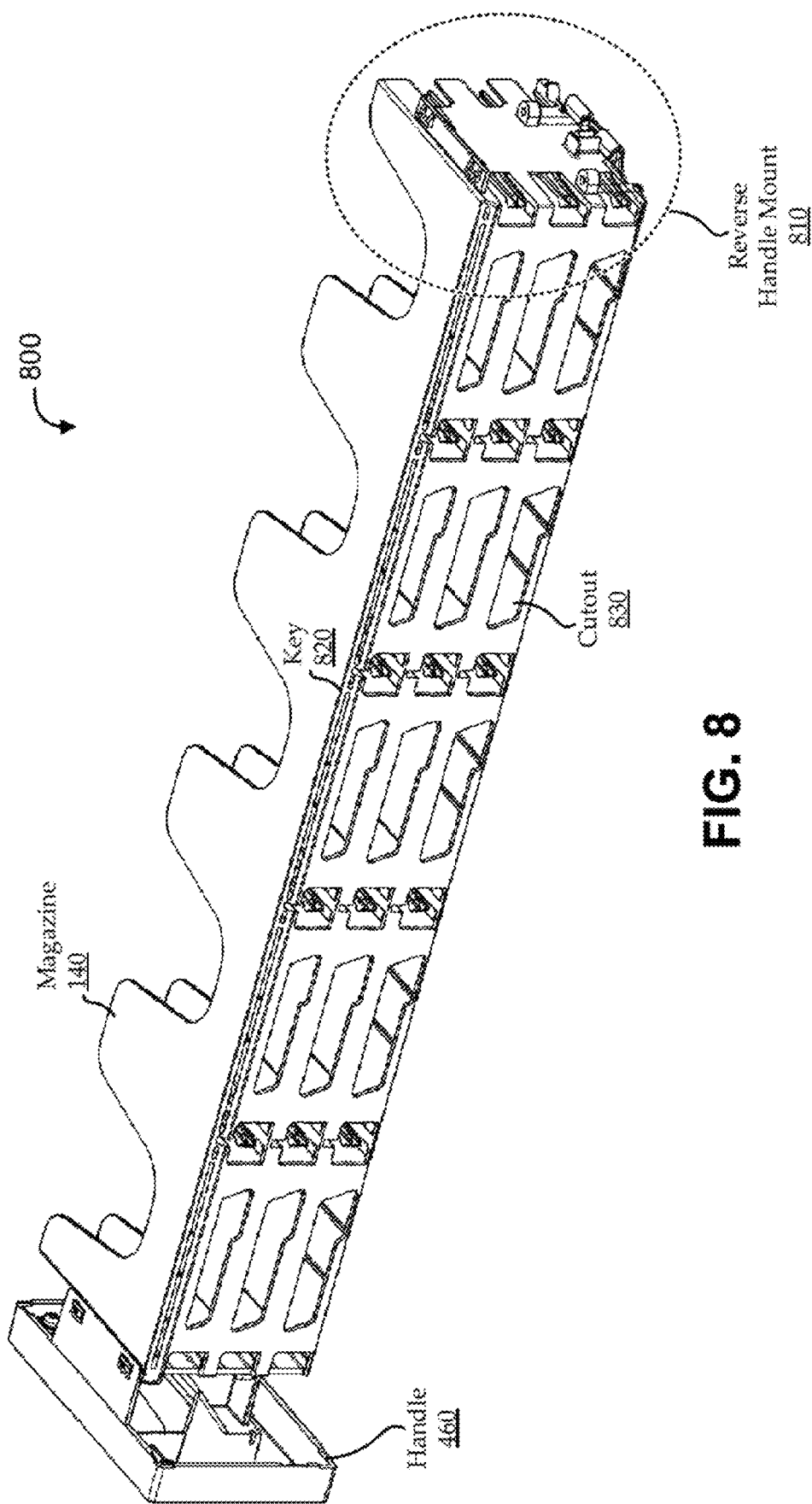
FIG. 8 shows a projection view of a backside of an illustrative magazine, according to various embodiments.

FIG. 8 shows a projection view 800 of a backside of an illustrative magazine 140, according to various embodiments. Embodiments of the magazine 140 include a number of features in addition to targeting-related features described above. According to one such feature, embodiments of the magazine 140 include cutouts 830. These cutouts 830 are shaped and sized to facilitate manual ejection of cartridges from the magazine 140. For example, at least a portion of each cutout 830 is large enough for a finger to be inserted therein to physically push a cartridge out of their respective slot. The cutouts 830 are also shaped to eliminate a substantial amount of material, thereby reducing cost and weight of the magazine 140 structure, while keeping sufficient turtle to maintain structural integrity around the slots. Notably, the edges of the cutouts 830 are angled with respect to the direction in which the magazine 140 is installed in a module. This can mitigate catching of the edges on structures of the module. For example, as the magazine 140 is slidably engaged with the module, there may be a tendency of edges that are substantially orthogonal to the installation direction to collide with module structure; and angling those edges as shown can tend to reduce those collisions.

According to another feature, embodiments of the magazine 140 are configured to be reversible. As illustrated in FIG. 4, modules may be implemented to hold two or more magazines 140 in such a way that their respective slot openings face one another to provide access to the cartridges of both magazines 140 using a single robotic mechanism. As described above, the magazine 140 includes a handle 460 for use in installing and/or removing the magazine 140. Some embodiments of the magazine 140 include a symmetric base structure and a reversible handle mounting structure 810 that allows the installation of a handle 460 on either side of the magazine 140. In this way, the same base magazine 140 structure can be used on both sides of a module by changing the handle 460 location.

Some implementations of the magazine 140 further include a key 820 or other similar structure that prevents installation of a magazine 140 in the wrong side of the module. For example, suppose a handle 460 is connected to the magazine 140 in such a way as to facilitate installation of the magazine 140 on a right side of the module. The key 820 can be configured to interfere with structures on the left side of the module, thereby preventing installation of the magazine 140 on that side. However, if the handle 460 is connected to the handle mounting structure 810 on the other side of the same magazine 140, the key 820 can be oriented to allow installation of the magazine 140 on the left side of the module and not on the right side of the module.

It will be appreciated that the magazine 140 shown in FIGS. 4-8 illustrates only one of many implementations of magazines 140 for providing the functionality described herein. For example, other implementations may provide different numbers, shapes, configurations, etc. of slots. Embodiments include additional features. In some embodiments, each slot includes one or more detent arms and bumps for improved cartridge retention. For example, sidewall features of a magazine 140 slot are molded in such a way as to create a spring loaded bump operable to interface with a corresponding notch in the cartridge geometry. In other embodiments, the walls include bumper bars and/or other features to help guide cartridges into appropriate positions within the slots. For example, bumper bars can be molded into the walls at approximately 90° to the back wall of a respective slot, walls can be tapered (e.g., at two degrees or some other angle), etc. Further, embodiments can use other types, numbers, arrangements, etc. of targeting features.

The embodiments described above and/or other embodiments can be used to provide various types of functionality, including functionality of the methods described below. The method embodiments described below can also be performed using embodiments other than those described above. Accordingly, various magazine embodiments described above in method embodiments described below should not be construed as limiting the scope of the other.

Figure 9:
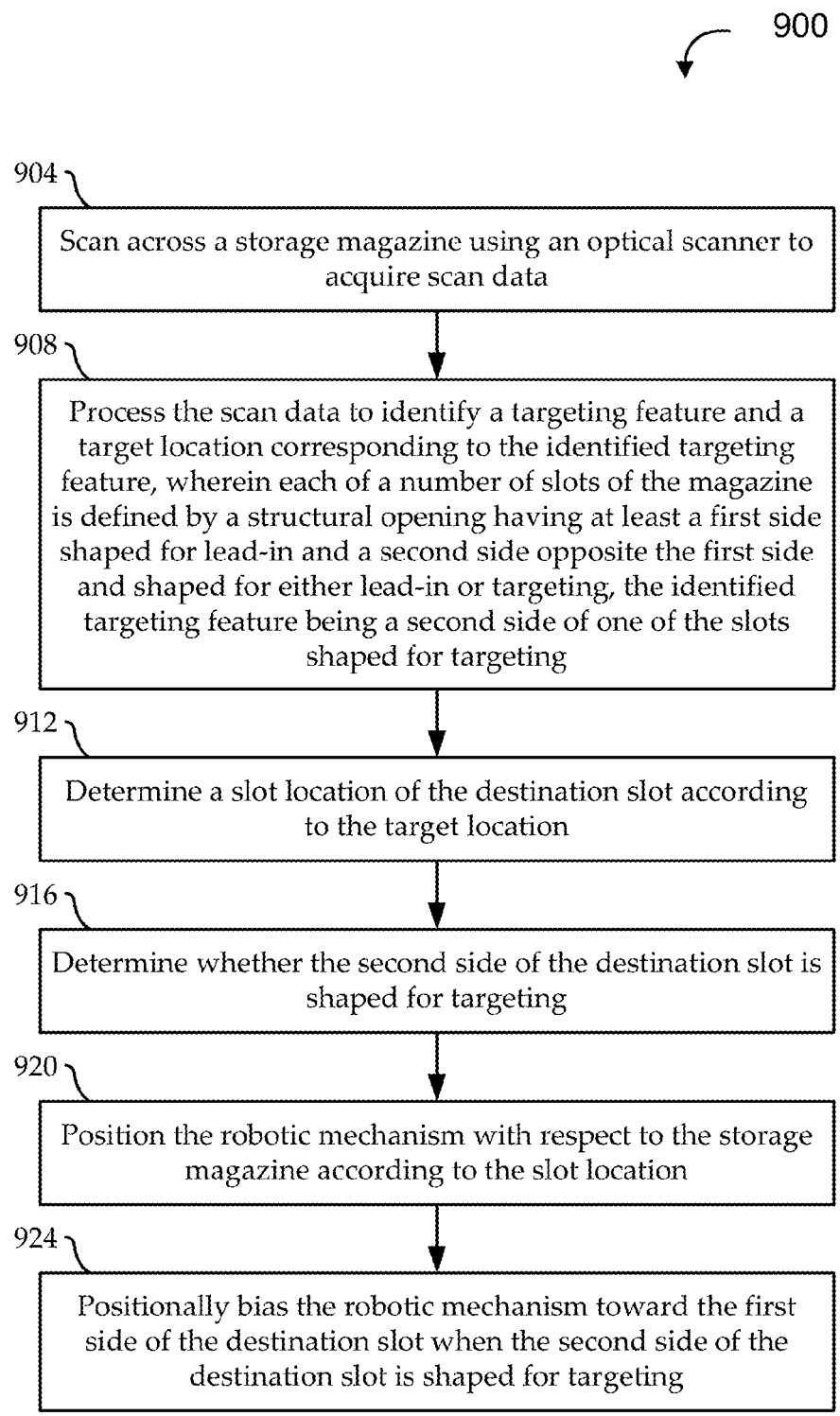
FIG. 9 shows a flow diagram of an illustrative method for positioning a robotic mechanism with respect to a storage magazine, for example, to install a data cartridge in or remove the data cartridge from a destination slot of a plurality of slots of the storage magazine, according to various embodiments.

Turning to FIG. 9, a flow diagram is shown of an illustrative method 900 for positioning a robotic mechanism with respect to a storage magazine, for example, to install a data cartridge in or remove the data cartridge from a destination slot of a plurality of slots of the storage magazine, according to various embodiments. Embodiments of the method 900 begin at stage 904 by scanning across the storage magazine using an optical scanner to acquire scan data. For example, a spot scanner (e.g., a VCSEL) is swept across a scan window that includes at least one targeting feature of a magazine to acquire optical scan data.

At stage 908, the scan data is processed to identify a targeting feature and a target location corresponding to the identified targeting feature. As described above, the magazine includes a number of slots for receiving data cartridges. Each slot is defined by a structural opening having at least a first side shaped for lead-in and a second side opposite the first side that is shaped either for lead-in or for targeting. For example, each slot has either: a lead-in feature on the right side of its opening and a targeting feature on the left side of its opening; a lead-in feature on the left side of its opening and a targeting feature on the right side of opening; or a lead-in feature on both sides of its opening. Accordingly, the targeting feature identified at stage 908 is the second side (e.g., the right or left side) of one of the slots that is shaped for targeting.

In some embodiments, identifying the targeting feature and the targeting location involves scanning across the storage magazine in a first dimension to find an edge of the targeting feature that is substantially orthogonal to the first dimension. For example, sweeping an optical scanner in an X direction can produce scan data that can be decoded to identify edges running substantially in a Y direction. One or more of these edges can be used to locate the robotic mechanism in the X dimension. In other embodiments, identifying the targeting feature in the targeting location involves scanning across the storage magazine in a first dimension and in a second dimension to find two targeting edges. In some implementations, the targeting feature is rectangular, such that the two targeting edges are orthogonal. However, the first and second dimensions may or may not be substantially orthogonal, and the two targeting edges may or may not be substantially orthogonal.

Further, some implementations include targeting features that have a long edge and a short edge. In those implementations, embodiments can attempt to identify the long edge before identifying the shortage. For example, if an initial position of the robotic mechanism is insufficiently precise for slot locating (e.g., if the initial position was set according to dead reckoning and/or other techniques that may or may not take into account any measured feature of the magazine or surrounding structure), there may be a relatively large tolerance in that initial position. It may, therefore, be more reliable for the scanner to find the longer edge from that less precise initial position. The longer edges can then be used to narrow the field in which to scan for the shorter edges. According to some embodiments, having identified the first edge in the second edge of the targeting feature, the target location can be identified as a two dimensional location.

At stage 912, the target location of the targeting feature identified at stage 908 is used to determine a slot location of the destination slot. In some embodiments, the target location is used alone or in conjunction with one or more other target locations to interpolate a slot location of the destination slot. In other embodiments, the data storage system maintains a slot map that includes nominal slot locations for some or all slots of a magazine. The slot map may be generated as part of an auditing function, or it may be preloaded for a particular magazine, magazine standard, etc. In embodiments that use a slot map, the target location identified at stage 908 can be used to adjust and/or verify the slot map location (e.g., to account for accumulated tolerances, etc.).

At stage 916, a determination is made as to whether the second side of the destination slot is shaped for targeting (i.e., whether side substructure of the destination slot includes a targeting feature). As described above, for example, some slots include a targeting feature on the right side of their opening, on the left side of their opening, or on both sides of their opening. The determination at stage 916 can be made in various ways. In some implementations, optical scanning is used to determine whether the second side of the destination slot is shaped for targeting. In other implementations, a slot map is used to determine whether the second side of the destination slot is shaped for targeting.

The robotic mechanism is positioned with respect to the storage magazine according to the slot location at stage 920. One or more drive systems can be used to locate the robotic mechanism, for example, according to a set of local coordinates. The positioning is set and/or modified (e.g., according to dynamic feedback) as a function of measured values of one or more locations, including the identified targeting location. When the robotic mechanism is holding a data cartridge, positioning the robotic mechanism effectively positions the data cartridge.

Some traditional targeting techniques couple a precise targeting feature (e.g., a light guide) with the structure of each slot. The robotic mechanism can precisely locate each slot by locating its corresponding local targeting feature, without interpolating location data from non-local targets, without experiencing accumulation of location tolerances, etc. As such, those traditional techniques may not be concerned with possible collisions between data cartridges and magazine targets. Other traditional targeting techniques use targets that are separate from the base structure of the magazine. As such, those other traditional techniques may be similarly unconcerned with possible collisions between data cartridges and magazine targets. As described above, however, magazine embodiments described herein incorporate magazine targets into the slot structure.

While this type of incorporation can reduce cost and complexity, a can also yield issues relating to possible collisions between data cartridges and magazine targets. For example, while the scan data acquired at stage 904 and processed at stage 908 can be used for relatively accurate positioning, the positioning may not be sufficiently accurate to avoid collisions between data cartridges and targeting edges of slots having targeting features. At stage 924, embodiments positionally biased the robot mechanism toward the first side of the destination slot (e.g., the side of the slot that has the lead-in features) when the second side of the destination slot is shaped for targeting. In some embodiments, the robot mechanism is always positionally biased toward the first side of the destination slot, regardless of whether the second side is shaped for targeting. In other embodiments, the robot mechanism is not positionally biased when it is determined at stage 916 that the second side of the destination slot is not shaped for targeting (i.e., that the second side of the destination slot is also shaped for lead-in).

In some implementations, the first side is shaped for lead-in over a lead-in distance. For example, the side substructure of the slot is beveled (i.e., is angled into the slot opening), and the beveled surface has a particular width. The beveled surface is angled so that any collision between a data cartridge and the beveled edge during installation of the data cartridge into the destination slot does not substantially interfere with the installation of the data cartridge into the destination slot. Accordingly, the width of the beveled surface can effectively define the lead-in distance. In some embodiments, positionally biasing the robotic mechanism at stage 924 involves moving the robot in the direction of the first side by an amount that is less than or equal to the lead-in distance.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The various operations of methods and functions of certain system components described above may be performed by any suitable means capable of performing the corresponding functions. The means may include various hardware and/or software component(s) and/or module(s), including, but not limited to a circuit, an application specific integrated circuit (ASIC), or processor. For example, logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A method for positioning a robotic mechanism with respect to a storage magazine to install a data cartridge in or remove the data cartridge from a destination slot of a plurality of slots of the storage magazine, the method comprising:
    scanning across the storage magazine using an optical scanner to acquire scan data;
    processing the scan data to identify a first targeting feature and a target location corresponding to the identified first targeting feature, wherein each of the plurality of slots is defined by a structural opening having at least a first side shaped to form a lead-in feature and a second side opposite the first side and shaped to form either a lead-in feature or the targeting feature, such that the second side of one of the plurality of slots is shaped to form the identified targeting feature;
    determining a slot location of the destination slot according to the target location;
    determining whether the second side of the destination slot is shaped to form the targeting feature;
    positioning the robotic mechanism according to the slot location; and
    positionally biasing the robotic mechanism toward the first side of the destination slot when the second side of the destination slot is shaped to form the targeting feature, such that the lead-in feature operates to reduce interference between one of the data cartridges and the first side while the data cartridge is being installed in the destination slot.

2. The method of claim 1, wherein:
    the second side is shaped to form the targeting feature when the second side comprises an edge that is sufficiently sharp to be identified and located by the optical scanner to within a predetermined accuracy.

3. The method of claim 1, wherein:
    the second side of the destination slot is shaped to form the identified first targeting feature.

4. The method of claim 1, wherein:
    the storage magazine comprises at least two slot locations each having its second side shaped to form the targeting feature and at least one slot location having its second side shaped to form the lead-in feature.

5. The method of claim 1, wherein:
    scanning across the storage magazine using an optical scanner to acquire scan data comprises scanning in a first dimension and in a second dimension;
    processing the scan data to identify the first targeting feature and the target location corresponding to the identified first targeting feature comprises:
        identifying a first edge of the first targeting feature from scan data acquired while scanning in the first dimension;
        identifying a second edge of the first targeting feature from scan data acquired while scanning in the second dimension; and
        identifying the target location as a two-dimensional location according to the first and second edges of the first targeting feature; and
    positioning the robotic mechanism according to the slot location comprises positioning the robotic mechanism in the first and second dimensions according to the two-dimensional location.

6. The method of claim 1, wherein:
- the first targeting feature has a substantially rectangular shape, the first edge being a relatively long edge of the rectangular shape and the second edge being a relatively short edge of the rectangular shape;
- processing the scan data further comprises defining a scan window as a function of the first edge after scanning across the storage magazine in the first dimension and before scanning across the storage magazine in the second dimension; and
- scanning across the storage magazine in the second dimension comprises scanning across the storage magazine within the scan window.

7. The method of claim 1, wherein determining the slot location of the destination slot according to the target location comprises:
- identifying one of a plurality of records in a slot map that corresponds to the destination slot, the record comprising a nominal slot location of the destination slot;
- determining the slot location according to the nominal slot location and the target location.

8. The method of claim 1, wherein:
- the first side is shaped to form the lead-in feature over a lead-in distance; and
- positionally biasing the robotic mechanism toward the first side when the second side of the destination slot is shaped for targeting comprises moving the robot in the direction of the first side by an amount that is less than or equal to the lead-in distance.

9. The method of claim 1, wherein positioning the robotic mechanism according to the slot location comprises:
- positioning the robotic mechanism according to the slot location without positionally biasing the robotic mechanism toward the first side of the destination slot when the second side of the destination slot is shaped to form the lead-in feature.

10. A data storage system comprising:
- a magazine comprising a plurality of slots operable to receive data cartridges via an opening having a first side shaped to form a lead-in feature and a second side opposite the first side and shaped to form either the lead-in feature or a targeting feature, wherein at least one slot has its second side shaped to form the targeting feature;
- an optical scanner operable to scan across the magazine to acquire scan data;
- a robotic hand assembly operable to install a data cartridge in or remove the data cartridge from a destination slot of the plurality of slots of the magazine; and
- a processor operable to:
- process the scan data to identify a first targeting feature and a target location corresponding to the identified first targeting feature, wherein the identified first targeting feature is the second side of one of the plurality of slots shaped to form the targeting feature;
- determine a slot location of a destination slot according to the target location;
- determine whether the second side of the destination slot is shaped to form the targeting feature;
- position the robotic hand assembly according to the slot location; and
- positionally bias the robotic hand assembly toward the first side of the destination slot when the second side of the destination slot is shaped to form the targeting feature, such that the lead-in feature operates to reduce interference between one of the data cartridges and the first side while the data cartridge is being installed in the destination slot.

11. The data storage system of claim 10, further comprising:
- a module operable to house at least the magazine and to provide a targeting environment suitable for scanning by the optical scanner and for installation of data cartridges into and removal of the data cartridge from the plurality of slots of the magazine.

12. The data storage system of claim 10, wherein:
- the module is sized to fit within the height, depth, and width of a "2 RU" volume of a standard equipment rack; and
- the magazine comprises an array of fifteen slot locations that is three rows high by five columns deep, the array being fully enclosable within the module.

13. A storage magazine comprising:
- a structural framework that defines a plurality of slot locations, each configured to receive data cartridges via an opening, and each having:
- a first sub-structure on a first side of the opening comprising a lead-in feature shaped to reduce interference between one of the data cartridges and the first sub-structure while the data cartridge is being installed in its corresponding slot location; and
- a second sub-structure on a second side of the opening opposite the first side comprising either the lead-in feature or a targeting feature,
- wherein the second sub-structure of at least one slot comprises the targeting feature.

14. The storage magazine of claim 13, wherein:
- the targeting feature comprises an edge that is detectable by an optical scanner to a degree of accuracy sufficient for positioning a robotic mechanism with respect to the at least one slot location in at least one dimension.

15. The storage magazine of claim 13, wherein:
- the targeting feature comprises at least two edges that are detectable by an optical scanner to a degree of accuracy sufficient for positioning a robotic mechanism with respect to the at least one slot location in at least two substantially orthogonal dimensions.

16. The storage magazine of claim 13, wherein the lead-in feature comprises a bevel or a radius.

17. The storage magazine of claim 13, wherein:
- the structural framework comprises six sub-structures that define five slot locations;
- four of the six sub-structures each comprises the lead-in feature; and
- two of the six sub-structures each comprises the targeting feature.

18. The storage magazine of claim 13, wherein:
- the first sub-structure of one slot location is the second sub-structure of another slot location.

19. The storage magazine of claim 13, wherein:
- the targeting feature is integrated into its corresponding second sub-structure by shaping the second sub-structure to form the targeting feature.

* * * * *

UNITED STATES PATENT AND TRADEMARK OFFICE
CERTIFICATE OF CORRECTION

PATENT NO. : 8,855,808 B2  
APPLICATION NO. : 13/480412  
DATED : October 7, 2014  
INVENTOR(S) : Ostwald et al.

Page 1 of 1

It is certified that error appears in the above-identified patent and that said Letters Patent is hereby corrected as shown below:

In the Specification

In column 1, line 23, delete "(10)" and insert -- (IO) --, therefor.

In column 4, line 48, delete "and or" and insert -- and/or --, therefor.

In column 5, line 41, delete "and or" and insert -- and/or --, therefor.

In column 9, line 29, delete "and or" and insert -- and/or --, therefor.

Signed and Sealed this  
Twenty-eighth Day of April, 2015

Michelle K. Lee  
*Director of the United States Patent and Trademark Office*